United States Patent Office 3,503,882
Patented Mar. 31, 1970

3,503,882
PAINT COMPOSITION
Arthur Richard Fitch, Philadelphia, Pa., assignor to Turco Paint & Varnish Co., Philadelphia, Pa., a corporation of Delaware
No Drawing. Filed Sept. 6, 1966, Ser. No. 577,183
Int. Cl. H01j *1/26;* C09k *3/00*
U.S. Cl. 252—62.54                    13 Claims

ABSTRACT OF THE DISCLOSURE

Paint composed of an intimate mixture of an iron powder and an epoxy ester resin with an emulsifiable polyethylene wax and an organophilic alkyl ammonium bentonite dispersed in a paint hydrocarbon solvent provides, when applied to a substrate and dried, a surface to which magnetic symbols will adhere and which will accept chalk and from which chalk markings may be readily erased.

---

The present invention relates to a novel paint composition for use in providing a surface for visual aid to communication and to the painted structure made therefrom; and, more particularly, the invention relates to a stable paint composition which, when applied to a substrate and dried, provides a surface to which magnetic symbols will adhere, which will accept chalk and from which chalk markings may be readily erased.

Paints adapted to provide a chalk-receiving surface are known as are panels adapted to hold magnetized symbols. Each is used as a tool for visual aid to communication, including the field of education. Magnetically attractive panels are usually made from sheet steel to which is applied a paint coating or a plastic or paper cover. Such panels are fabricated in a manufacturing plant. Attempts have been made to provide magnetically attractive coatings by aplying a coat of paint to a panel, dusting the wet paint with iron powder and then, when the paint is dry, applying another coat of paint over the layer of iron powder. Such a procedure is time-consuming and laborious, and must be performed in the shop since applying the iron powder to a vertical surface is unsatisfactory. Attempts to provide a practical magnetically attractive coating in the field have not been successful.

A liquid paint composition that is stable, requires no further additive or processing by the user, beyond possibly simple stirring or agitation, and can be applied to a wide variety of vertical as well as horizontal substrates in the field to provide a surface which will not only hold magnetic symbols but also serves as an excellent chalking surface, is highly desirable.

It is the principal object of the present invention to provide a liquid paint composition which, when applied to a substrate and dried, provides a surface to which magnetic symbols will adhere and which has chalk acceptance and erasing characteristics comparable to that of slate.

It is another object of the present invention to provide a liquid paint composition of the type described which is stable in the sense that no more than simple stirring or agitation is required, after standing for long periods of time, to place it in condition for application by brushing, rolling, spraying, or the like.

Still another object of the present invention is to provide a stable liquid paint composition of the type described which can be used at the site of application long after its preparation and which requires no further additive or additives just prior to application.

A further object of the present invention is to provide a stable, ready-to-use, liquid paint composition of the type described which can be applied to vertical as well as horizontal substrates.

Yet another object of the present invention is to provide a stable, ready-to-use, liquid paint composition of the type described with application characteristics and film qualities appropriate for application to a wide variety of substrates and which dries and cures at room temperature.

A specific object of the present invention is to provide a stable, ready-to-use, liquid paint composition of the type described which requires only one—or at the most, two—coats and which, at the same time as providing the stated magnetically attractive and chalking characteristics, also provides any desired color finish.

These and other objects, including the provision of a coated substrate to which magnetic symbols will adhere and which has excellent chalk acceptance and erasing characteristics, will become apparent from a consideration of the following specification and claims.

The paint composition of the present composition consists essentially of an intimate mixture of iron powder and epoxy ester resin, the iron powder being present in an amount of from about 70 to about 85%, by weight, based on the combined weight of the iron powder and epoxy ester resin; emulsifiable polyethylene wax having a molecular weight from about 1500 to about 6000 in an amount of from about 0.9 to about 3%, by weight, based on the weight of the iron powder; an organophilic alkyl ammonium bentonite having an alkyl group containing from 10 to 20 carbon atoms in an amount of from about 0.4 to about 2%, by weight, based on the weight of the iron powder, and hydrocarbon solvent in an amount to provide a solids content of from about 75 to about 85%, by weight.

It will be noted that the paint composition contains a high proportion of iron powder. This provides a coating to which magnetic symbols will adhere and which has excellent chalk-acceptance and erasing characteristics. Iron powder is, of course, very heavy and tends to settle out of liquid carriers to a dense immobile layer. Nevertheless, the paint composition of this invention is stable in that it can stand for months without settling and any slight settling that may take plate on prolonged standing can be reversed by stirring or agitation on a paint can agitator. This paint composition can be applied to vertical as well as horizontal substrates without sagging. No additive, such as a catalyst or even the iron powder itself, need be added by the user. Thus, the present paint composition is ready to use at it comes from the can, and can be applied at room temperature by conventional means, like brushing, rolling or spraying, at the site, like a schoolroom, without special equipment, treatment or processing. Of importance is the fact that the paint will adhere well to a wide variety of structural substrates, including plaster, paper, cardboard, slate, cork, composition board, wood, aluminum, zinc, cinder block, old oil paint, old latex paint and glass. In addition, the paint has other characteristics desirable in paints generally as will appear from the data set forth below. In a preferred embodiment color pigment may be included in the composition to provide any desired color finish. The composition can be applied in one coat, or, at the most, two coats, depending upon the substrate, will be required. Thus, all desired characteristics, including color when a certain color beyond that provided by the basic composition is desired, can be achieved easily with a minimum of labor.

The coating provided by the present paint composition will hold magnetic symbols, such as letters, numbers, words and other shapes, and these may subsequently be removed, rearranged or left in place as desired. In addition, as will appear from the data hereinafter set forth, the coating has chalk-acceptance and erasing characteristics comparable to those of slate. Thus, the coating can be used as a valuable visual aid tool for communication with magnetic symbols or chalk or both at the same time.

The principal component of the present paint composition is iron powder. By this is meant a finely-divided (substantially all through 100 mesh, Tyler) ferrous material which is attracted to and held by a magnet. This may be iron, including steel, or an iron alloy having the stated property. Low carbon steel is preferred, particularly that available as molding grade steel powder for powder metallurgical use. The iron powder employed in the present paint composition will not be magnetic itself; that is, it will not attract and hold another unmagnetized iron body. Preferably, over half of the iron powder passes through a 200 mesh (Tyler) screen. As stated the iron powder will be present in an amount of from about 70 to about 85%, by weight, based on the combined weight of the iron powder and epoxy ester resin. Preferably the iron powder is present in an amount of from about 75 to about 80%, on the stated basis.

The principal binder of the present paint composition is the epoxy ester resin. These are prepared, as is known, by reacting a higher unsaturated fatty acid with the hydroxyl groups of an epoxy resin. Epoxy resins generally have the structure of the diglycidyl ether of bisphenol A made by reacting epichlorohydrin with bisphenol A in the presence of a base, like sodium hydroxide. The unsaturated fatty acid reacted with the epoxy resin to form the epoxy ester is usually derived from a drying or semi-drying oil like linseed oil, talloil, soya bean oil and castor oil, and the principal acids so derived contain from 15 to 18 carbon atoms, such as ricinoleic acid, oleic acid, linoleic acid and linolenic acid.

Another essential component of the present paint is emulsifiable polyethylene wax having a molecular weight of from about 1500 to about 6000, preferably from about 2000 to about 2500. These materials have an acid number from about 2 to about 50. Reference may be made to U.S. Patent No. 3,123,488 for further discussion of these emulsifiable polyethylene waxes. The emulsifiable polyethylene wax will be present in an amount of from about 0.9 to about 3%, preferably from about 0.9 to about 1.5%, by weight, based on the weight of the iron powder.

The present paint composition will also have present an organophilic alkyl ammonium bentonite having an alkyl group containing from 10 to 20 carbon atoms. Such compounds are known and include the dodecyl ammonium bentonite and octadecyl ammonium bentonite of U.S. Patent 2,531,427, to which reference may be made. There may be more than one and up to four alkyl groups present such as in dimethyldioctadecyl ammonium bentonite prepared from magnesium bentonite ("Bentone" 38 of National Lead Co.). The organophilic alkyl ammonium bentonite will be present in an amount of from about 0.4 to about 2%, preferably from about 0.4 to about 1%, by weight, based on the weight of the iron powder.

In preparing the persent paint composition, the foregoing materials will be dispersed in a common paint solvent which normally consists mainly of aliphatic and aromatic hydrocarbon liquids, such as petroleum naphtha, mineral spirits, solvent naphtha, heavy aromatic naphtha, benene, toluene, xylene, and the like. As is well known in paint technology a minor amount of other solvents or diluents may be added for specific purposes; for example high flash naphtha or butyl Cellosolve may be added to increase drying time. The solvent is transient since it leaves the paint composition after application and drying and, therefore, does not contribute to the properties of the final coating.

The foregoing are the essential components of the present paint composition. Other conventional paint additive materials may be added which do not deleteriously alter the characteristics of the composition and which, in fact, impart desirable features. For example, conventional dryers, like cobalt—or lead naphthenate—may be added, as may conventional anti-flooding agent and anti-skinning agents.

One of the most desirable optional additives is pigment to provide a desired decorative color, where the metallic gray color of the unpigmented composition is not desired in a particular application. The particular pigment or pigments used will depend upon the exact color desired. For example, a combination of titanium dioxide, chromium oxide and phthalocyanine green may be used to achieve an attractive chalk board green. Examples of other pigments which may be used along or in various combinations to achieve desired color effects are phthalocyanine blue, carbon black, lamp black, molybdate orange, chrome yellow and iron oxide. The amount of color pigment may range up to about 30%, by weight, based on the weight of the iron powder.

The paint composition is prepared by mixing the various materials together in accordance with known paint-making technology, including heating the mixture during mixing to a moderately elevated temperature, usually from about 110 to about 150° F., preferably from about 120 to 135° F.

The invention is further described by the following specific examples which are given for the purpose of illustration only and are not to be considered as limiting the scope of the invention in any way.

EXAMPLES 1–3

The following is a more complete description of some of the materials used in these examples and set forth in Table I below: the silicone-barium sulfate is silicone precipitated on barium sulfate (Imperial Antiflooding Agent 2262 of Hercules Powder Co.). The emulsifiable polyethylene wax has an average molecular weight of 2000 and an acid number of 10–20 ("MPA" 60 of Baker Castor Oil Co.). The iron powder is powder metallurgy molding grade steel containing 99+% Fe, 0.01% C, 0.12% Mn, 0.003% P, 0.009% S, less than 0.03% Si and 0.1% $H_2$ loss, and having the screen analysis

| Screen (Tyler): | Percent |
|---|---|
| +80 | 0 |
| −80 +100 | 1.6 |
| −100 +150 | 15.7 |
| −150 +200 | 19.4 |
| −200 +250 | 12.4 |
| −250 +325 | 23.0 |
| −325 | 27.9 |

The epoxy ester resin is epichlorhydrin bisphenol A (860–1015 gram mol. wt. per gram epoxide unit, melting point 95–105° C.) esterified with soya bean fatty acid, including a small amount of dimerized soya bean fatty acid. It has a Gardner viscosity of O-Q at 25° C. as a 50% solution in 95 parts of heavy aromatic naphtha and 5 parts of xylene and an acid value of 10. The cobalt naphthenate is as a 50% solution in mineral spirits, 6% cobalt content, and the lead naphthenate is as a 60% solution in mineral spirits, 24% lead content. The figures set forth in the three right hand columns are parts by weight.

TABLE I

|  | 1 | 2 | 3 |
|---|---|---|---|
| Titanium dioxide | 5.4 | 5.7 |  |
| Chromium oxide | 3.2 | 3.4 |  |
| Phthalocyanine green | .3 | .3 |  |
| Silicone-barium sulfate | .1 | .1 |  |
| Emulsifiable polyethylene wax | .5 | .5 | .6 |
| Dimethyldioctadecyl ammonium bentonite | .2 | .2 | .3 |
| Methanol | .2 | .2 | .3 |
| Iron powder | 52.0 | 54.0 | 60.0 |
| Epoxy ester resin | 16.4 | 14.0 | 15.5 |
| Heavy aromatic naphtha | 18.7 | 17.1 | 18.4 |
| Xylene | 2.5 | 4.0 | 2.7 |
| Cobalt naphthenate | .2 | .2 | .2 |
| Lead naphthenate | .3 | .3 | .3 |
| Mineral spirits |  |  | 1.7 |

Working properties and appearance (the first six items in Table II below) were evaluated by comparison to an alkyd enamel of approximately the same color (as Examples 1 and 2) and gloss but of lower viscosity prepared according to Government Specification TTE–529 for eggshell enamel. The enamel is rated 10, 10 being the best, and 1 is the poorest rating on the scale.

Adhesion was tested by cross-hatching the fully dried and cured coating with a razor blade, applying a pressure-sensitive cellophone tape and pulling away.

Chalking characteristics were tested by comparison with slate, the slate being rated as 10.

The results are as follows:

TABLE II

| Evaluation | Example 1 | Example 2 | Example 3 |
|---|---|---|---|
| (1) Brushing | 6 | 5 | 6 |
| (2) Hiding | 10 | 10 | 6 |
| (3) Flow and levelling | 8 | 6 | 8 |
| (4) Drying | 10 | 10 | 10 |
| (5) Color uniformity | 10 | 10 | 50 |
| (6) Gloss uniformity | 5 | 7 | 1 |
| (7) Adhesion to— | | | |
| Plaster | Excellent | Excellent | Excellent |
| Paper | Excellent | Excellent | Excellent |
| Cardboard | Excellent | Excellent | Excellent |
| Slate | Excellent | Excellent | Excellent |
| Cork | Excellent | Excellent | Excellent |
| Composition hardboard | Excellent | Excellent | Excellent |
| Wood | Excellent | Excellent | Excellent |
| Cinder block | Excellent | Excellent | Excellent |
| Old latex paint | Excellent | Excellent | Excellent |
| Aluminum | Very good | Very good | Very good |
| Old oil paint | Very good | Very good | Very good |
| Zinc | Good | Good | Good |
| (8) Chalk acceptance | 10 | 10+ | 10 |
| (9) Chalk removability | 9 | 8 | 9 |

Coatings of each of the foregoing example exhibited very good attractiveness to pieces of magnetic tape. The paints of the examples were completely stable after standing five months.

Modification is possible in the selection of particular materials and amounts thereof without departing from the scope of the invention.

What is claimed is:

1. A liquid paint composition for providing a surface coating which will hold magnetic symbols and which also has high chalk-acceptance and erasing characteristics consisting essentially of an intimate mixture of iron powder and epoxy ester resin the acid moiety of which is that of an unsaturated higher fatty acid, the iron powder being present in an amount of from about 70 to about 85%, by weight, based on the combined weight of the iron powder and epoxy ester resin; emulsifiable polyethylene wax having a molecular weight of from about 1500 to about 6000 in an amount of from about 0.9 to about 3%, by weight, based on the weight of the iron powder; an organophilic alkyl ammonium bentonite having an alkyl group containing from 10 to 20 carbon atoms in an amount of from about 0.4 to about 2%, by weight, based on the weight of the iron powder, and hydrocarbon solvent in an amount to provide a solids content of from about 75 to about 85%, by weight.

2. The paint composition of claim 1 wherein said iron powder is steel powder over half of which is finer than 200 mesh.

3. The paint composition of claim 1 wherein said emulsifiable polyethylene wax has a molecular weight of from about 2000 to about 2500.

4. The paint composition of claim 1 wherein said emulsifiable polyethylene wax has an acid number of from about 2 to about 50.

5. The paint composition of claim 1 wherein said organophilic alkyl ammonium bentonite is dimethyldioctadecyl ammonium bentonite.

6. The paint composition of claim 1 wherein said iron powder is present in an amount of from about 75 to about 80%, by weight, based on the combined weight of said iron powder and said epoxy ester resin.

7. The paint composition of claim 1 wherein said emulsifiable polyethylene wax is present in an amount of from about 0.9 to about 1.5%, by weight, based on the weight of the iron powder.

8. The paint composition of claim 1 wherein said organophilic alkyl ammonium bentonite is present in an amount of from about 0.4 to about 1%, by weight, based on the weight of the iron powder.

9. The paint composition of claim 1 wherein said iron powder is present in an amount of from about 75 to 80%, by weight, based on the combined weight of said iron powder and said epoxy ester resin; wherein said emulsifiable polyethylene wax is present in an amount of from about 0.9 to about 1.5%, by weight, based on the weight of the iron powder, and wherein said organophilic alkyl ammonium bentonite is present in an amount of from about 0.4 to about 1%, by weight, based on the weight of the iron powder.

10. A coated substrate adapted to hold magnetic symbols and to accept chalk markings, said coating consisting essentially of an intimate mixture of iron powder and epoxy ester resin the acid moiety of which is that of an unsaturated higher fatty acid, the iron powder being present in an amount of from about 70 to about 85%, by weight, based on the combined weight of the iron powder and epoxy ester resin; emulsifiable polyethylene wax having a molecular weight of from about 1500 to about 6000 in an amount of from about 0.9 to about 3%, by weight, based on the weight of the iron powder, and an organophilic alkyl ammonium bentonite having an alkyl group containing from 10 to 20 carbon atoms in an amount of from about 0.4 to about 2%, by weight, based on the weight of the iron powder.

11. The coated substrate of claim 10 wherein said iron powder is present in an amount from about 75 to about 80%, by weight, based on the combined weight of said iron powder and said epoxy ester resin.

12. The coated substrate of claim 11 wherein said emulsifiable wax is present in an amount of from about 0.9 to about 1.5%, by weight based on the weight of the iron powder.

13. The coated substrate of claim 12 wherein said organophilic alkyl ammonium bentonite is present in an amount of from about 0.4 to about 1%, by weight, based on the weight of the iron powder.

References Cited

UNITED STATES PATENTS

| 2,733,222 | 1/1956 | Beacham | 260—18 |
| 3,093,919 | 6/1963 | Holtz | 40—142 |
| 3,110,693 | 11/1963 | Fisher | 260—22 |
| 2,773,043 | 12/1956 | Zukas | 260—3.3 |
| 3,024,711 | 3/1962 | Madison. | |
| 3,123,488 | 3/1964 | Lindlaw | 106—272 |

OTHER REFERENCES

Kirk-Othmer: Encyclopedia of Chemical Technology, 1964, vol. 3, Interscience Publishers, New York, N.Y., pp. 355–6.

TOBIAS E. LEVOW, Primary Examiner

A. P. DEMERS, Assistant Examiner

U. S. Cl. X. R.

106—32.5, 290; 117—240; 260—18, 37, 40

UNITED STATES PATENT OFFICE
CERTIFICATE OF CORRECTION

Patent No. 3,503,882　　　　Dated March 31, 1970

Inventor(s) Arthur Richard Fitch

It is certified that error appears in the above-identified patent and that said Letters Patent are hereby corrected as shown below:

Column 2, line 43, "plate" should be --place--;
Column 3, line 57, "persent" should be --present--;
Column 3, line 62, "benene" should be --benzene--;
Column 4, line 11, "along" should be --alone--; Column 4, line 22, --about-- should be inserted before "135°F."
Table I, Column 3, line 74, "3" should be --.3--;
Table II, Column 5, line 21, "50" should be --10--;
Table II, Column 5, line 22, "1" should be --5--;
Column 5, line 33, "example" should be --examples;
Column 6, Claim 9, line 14; --about-- should be inserted before "80%"

SIGNED AND SEALED
AUG 18 1970

(SEAL)
Attest:

Edward M. Fletcher, Jr.
Attesting Officer

WILLIAM E. SCHUYLER, JR.
Commissioner of Patents